Sept. 13, 1966  R. E. WINCHESTER, JR  3,272,896

METHOD AND APPARATUS FOR FORMING PLASTIC ARTICLES

Filed Nov. 13, 1963

INVENTOR.
RAYMOND E. WINCHESTER, JR.
BY
Burns, Doane, Benedict, Swecker & Mathis
ATTORNEYS United States Patent Office 3,272,896
Patented Sept. 13, 1966

3,272,896
METHOD AND APPARATUS FOR FORMING PLASTIC ARTICLES
Raymond E. Winchester, Jr., Pawcatuck, Conn., assignor to Monsanto Company, St. Louis, Mo., a corporation of Delaware
Filed Nov. 13, 1963, Ser. No. 323,398
16 Claims. (Cl. 264—98)

This invention pertains to techniques and devices for forming articles from plastic material. In particular it relates to methods and apparatus for forming hollow articles from tubular, thermo-plastic material such as polyethylene.

In the art of molding hollow plastic articles from extruded thermo-plastic material, a variety of techniques and devices have been proposed which are intended to facilitate the production of molded articles which require little or no finishing treatment after being removed from a mold. Particular difficulty has been encountered in attempting to minimize the formation of flash at mold junctions adjacent press-molded article portions, such as the threaded necks of flexible walled containers.

Other problems of substantial magnitude have involved attempts to properly support and stabilize lengths of plastic material for proper engagement with mold components so that some portions could be press molded and other portions radially expanded by pressurized fluid.

Additional difficulties encountered in the fabrication of hollow plastic articles have related to the forming of article end portions, such as threaded container necks, which have a wall thickness greater than the wall thickness of adjacent, article body portions. This problem has been of particular consequence where the outer diameter of such article end portions exceeded the outer diameter of the tubular length of plastic material which was used in fabricating the article.

In recognition of the need for more efficient and reliable plastic molding techniques and devices, it is an object of this invention to provide methods and apparatus for forming articles from tubular plastic material which substantially obviate or minimize fabrication difficulties of the types heretofore noted.

It is a particular object of the invention to provide such improved methods and apparatus which facilitate the formation of articles having neck or end portions which are larger in diameter than the length of plastic material used in their fabrication.

An additional object of the invention is to provide such methods and apparatus by means of which a length of plastic material may be effectively radially enlarged within a mold cavity while an open end of the length of material, although unrestrained against radial expansion or axial movement off of a mandrel, remains in engagement with the mandrel to allow the inflation of the article to take place.

A related object of the invention is to provide methods and apparatus for forming hollow plastic articles wherein an article end is formed by folding an end of a length of plastic material inwardly toward the interior of this length and radially pressing this inwardly folded end against an inner tubular wall portion of the length of material.

A still further object of the invention is to provide methods and apparatus by means of which hollow plastic articles, formed by inflation molding, require virtually no trimming or machining of press-molded portions.

Yet another object of the invention is to provide methods and apparatus which facilitate the proper support and stabilization of lengths of plastic material during the formation of hollow articles and which afford a uniquely high degree of clearance between apparatus components.

It is also an object of the invention to provide such methods and apparatus by means of which ample material may be provided for the formation of relatively thickened article end portions without the necessity of relying upon article end upsetting to completely form such thickened end portions.

One facet of the invention for partially accomplishing the previously delineated objectives entails a method and apparatus by means of which a tubular length of plastic material is uniquely positioned within a closed, sectional mold. This unique positioning is characterized by an open end of the length of material being in engagement with an end of mandrel means such that this end of the length of plastic material is unrestrained against radially outward movement and is radially spaced from interior wall portions of the closed mold sections. Pressurized fluid introduced into the interior of the thus supported length of plastic material causes radial expansion of the length while the end of the length remains in engagement with the end of the mandrel means, and the extremity of the end of said length remains spaced from the interior wall portions of the closed mold sections.

Another facet of the invention entails moving the mandrel means toward the open end of the length of plastic material, supported as described above, so as to cause this end of the length of plastic material to fold over inwardly toward the interior of the length and to ultimately lie adjacent an inner tubular wall portion of this length.

The overall advantages of the invention are achieved by combining the inflating and mandrel moving steps previously described. The preferred apparatus embodiment which enables the invention to be practiced with unique and optimum efficiency includes a multi-component, mandrel assembly characterized by a mandrel core and an encircling and independently movable mandrel sleeve. The mandrel core includes a central projection adapted to enter the end of a length of plastic material to stabilize this end against lateral axial displacement. The core further includes a press-molding portion and a shoulder serving to interconnect the press-molding portion with the central projection.

A preferred apparatus and mode of its manipulation, by means of which the objects of the invention may be accomplished, is schematically illustrated in the accompanying drawings.

Figure 4:
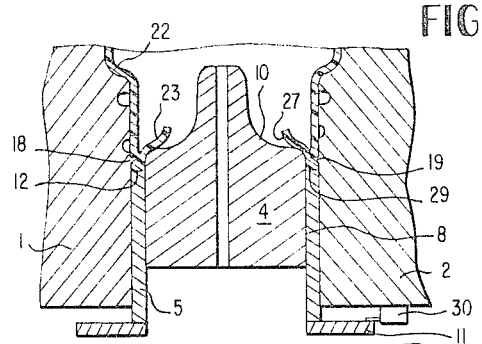
FIGURE 4 is a schematic, sectional illustration of the mold and mandrel components shown in FIGURE 3 subsequent to the advancing of the mandrel core and sleeve toward the open end of the length of plastic material.
Figure 5:
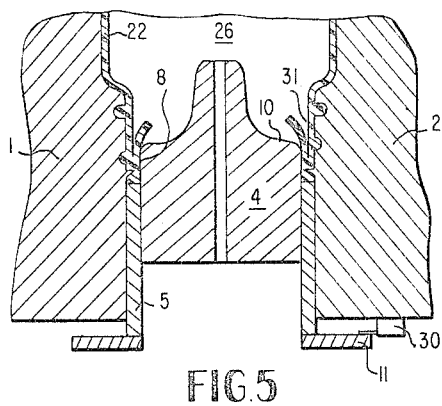
Figure 6:
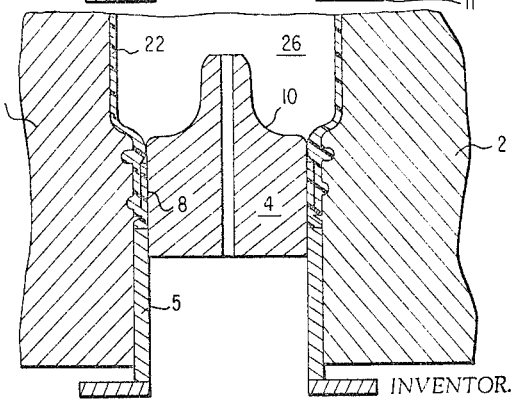

FIGURE 5 is a sectional, schematic illustration of the apparatus components shown in FIGURE 4 wherein the movement of the mandrel sleeve has been interrupted but the mandrel core has continued to move inwardly of the length of plastic material; and FIGURE 6 is a schematic, sectional illustration of the apparatus components shown in FIGURE 5 at the completion of the inward movement of the mandrel core.

FIGURES 1 through 6 schematically illustrate principal mold and mandrel assembly components which may be employed in practicing the preferred mode of the invention. These components may be utilized in combination with a molding machine of the type generally described in United States Letters Patent 2,952,034.

The mold components schematically illustrated in the drawings comprise mold halves 1 and 2. Mold halves 1 and 2 may be mounted upon conventional supporting and operating mechanisms for lateral movement between the separated, mold half position shown in FIGURE 1 and the closed, mold half position shown in FIGURES 2 through 6. Each mold half includes an interior cavity portion such that, when the mold halves are closed, a cavity 3 is defined having the peripheral configuration of the body portion of an article to be molded.

The mandrel assembly illustrated in FIGURES 1 through 6 comprises a core 4 and a sleeve 5. In the preferred embodiment, both sleeve 5 and core 4 are cylindrical in character; i.e., have circular cross sections. As illustrated, core 4 is telescopingly disposed within sleeve 5, with the axes of core 4 and sleeve 5 coinciding and extending generally vertically.

Core 4 may include a central, vertically extending passage 6 through which pressurized fluid such as air may be introduced into the interior of a length of plastic material in a manner to be subsequently described. Fluid passage 6 terminates in a fluid outlet 6a at the upper end of the central projection 9. As will be appreciated, pressurized fluid may be supplied to the lower end of passage 6 through conventional conduit and coupling means, not shown.

The lower, and largest diametered, portion 7 of core 4 includes a cylindrical outer wall 8 of constant diameter which functions to apply radial press molding pressure to an article end in a longitudinally progressive fashion as the core 4 is advanced into an article end.

Core 4 further includes a centrally disposed and generally cylindrical projection 9 which extends above the radial press molding portion 8. As shown, central projection 9 may be slightly tapered on its end to facilitate its being received within the lower, open end of a length of extruded and softened thermo-plastic material.

A shoulder portion 10 of core 4 extends generally laterally between the radial press molding core portion 7 and the central projection 9 and serves to interconnect these core portions.

Sleeve 5, which is annular and cylindrical in character, is mounted so as to be closely embracive of the outer periphery 8 of radial press molding portion 7 of core 4. Sleeve 5 may be supported on and carried by a mounting plate 11. An upper, radially extending end 12 of sleeve 5 preferably terminates on the cylindrical press molding surface 8 slightly below the shoulder 10 while a length of plastic material is being inflated and the mandrel assembly is advanced into this length as subsequently described.

Sleeve 5 and core 4 may be supported on conventional mounting means so as to be capable of either independent or concurrent, vertical axial movement. A representative mounting arrangement schematically illustrated in phantom line in FIGURE 1 includes piston rods 13a and 13b which extend from sleeve mounting plate 11 to coordinated, pressurized fluid motivated piston means not shown. Core 4 may be carried and motivated by a piston rod 14 which may be connected to the lower end of the core by a schematically illustrated mounting bracket 15. Piston rod 14 would extend from a pressurized-fluid, motivated piston which was operably independent of the pistons associated with sleeve 5 operating piston rods 13a and 13b.

Through conventional control means, the supplying of pressurized fluid to piston means associated with piston rods 13a and 13b may be coordinated with but independent of the supplying of pressurized fluid to the piston associated with piston rod 14 so as to allow for either concurrent or independent axial movement of the core 4 and sleeve 5.

Figure 2:
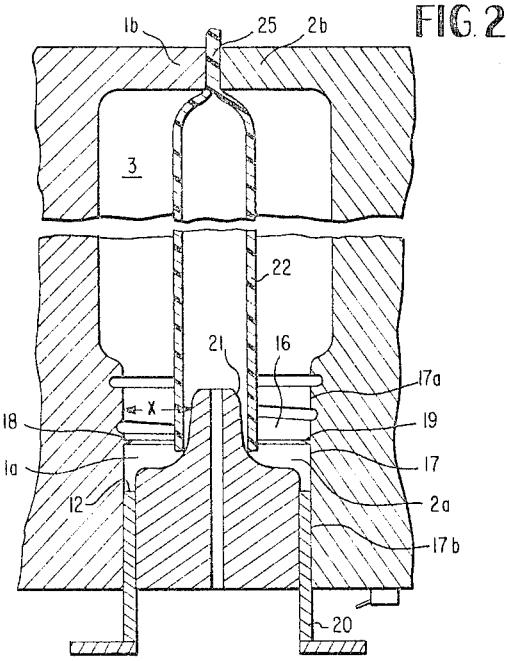
FIGURE 2 is a sectional, schematic illustration of the apparatus components and length of plastic material shown in FIGURE 1 subsequent to the closing of the mold sections.

In a conventional fashion, mold half 1 may include a semi-cylindrical, recessed end portion 1a while mold half 2 may include a mating semi-cylindrical end recess 2a. Recesses 1a and 2a cooperate, when molds 1 and 2 are closed as shown in FIGURE 2, so as to define a generally cylindrical passage 16 of substantially uniform diameter which is adapted to receive the sleeve 5 and core 4 of the mandrel assembly. Sleeve 5 is received within the passage 16 such that its outer periphery is disposed in telescoping engagement with the cylindrical wall means 17 of the passage 16. Such wall means 17 are defined by the cooperating semi-cylindrical walls of recessed mold portions 1a and 2a.

Passage wall means 17 includes an upper portion 17a which is indented outwardly so as to define details of article portions to be press molded such as neck threads for containers. The lower portion 17b of wall means 17, which extends upwardly from the lower end of the passage 16, may be smooth as shown in FIGURE 2.

A semi-cylindrical rim 18 projects radially inwardly from recess 1a of mold half 1 generally radially toward the operative positions of the core 4 shown in FIGURES 2 through 6. A similar semi-cylindrical rim 19 projects radially inwardly from the interior of the recess 2a of mold half 2 and is axially aligned with rim 18. Rims 18 and 19, with the mold halves 1 and 2 closed, cooperate to define a generally annular, radially inwardly projecting rim positioned just below the neck thread portion 17a of the wall means 17.

With the mold halves 1 and 2 closed about the core 4 and sleeve 5 assembly as shown in FIGURE 2, the central core projection 9 and the substantially coinciding outer wall 20 of sleeve 5 and wall means 17 of passage 16 are disposed in radially displaced positions. The radial spacing "x" between the outer periphery 21 of the core projection 9 and the wall means 17 or the sleeve wall 20 is a multiple of the wall thickness of the length of plastic material to be molded. This radial spacing should be sufficient to allow an end of such a length of plastic material to be folded over inwardly into itself in a manner to be hereinafter described.

A preferred sequence of manipulative steps involving the mold halves 1 and 2 and the mandrel core 4 and mandrel sleeve 5 is illustrated in FIGURES 1 through 6.

Figure 1:
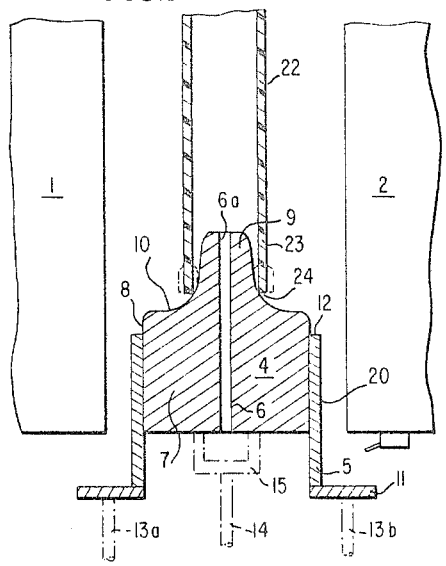
FIGURE 1 is a schematic, partially sectional illustration of apparatus components illustrating the mode of engagement of an open end of a length of a plastic material with a core portion of a mandrel assembly prior to the closing of mold sections.

A parison, i.e., extruded length of plastic material 22, which may be continuously supplied from an extrusion device such as that featured in U.S. Patent 2,952,034, is positioned between mold halves 1 and 2 with its lower open end portion 23 engaging the upper end of core 4. This engagement is characterized by the extremity 24 of the end 23 of the plastic length 22 axially abutting the shoulder 10, or possibly a lower, outwardly and downwardly enlarging portion of projection 9, with the projection 9 extending upwardly into the interior of the end 23 as shown in FIGURE 1. As will be appreciated, the end 23 of the tubular length 22 will engage the projection 9, or the shoulder 10 in such close proximity to the projection 9, that this projection 9 will serve to substantially prevent lateral axial displacement of the end 23 relative to the core 4.

Desirably, when the mold halves 1 and 2 are to be closed, the sleeve 5 and core 4 are positioned as shown in FIGURE 1 so that the closing of the mold halves will bring the wall portion 17b into engagement with the outer periphery 20 of the sleeve 5. In this fashion, when the molds are closed, the annular space between the wall 8 of core 4 and the wall means 17 of the mold halves 1 and 2 will be closed and thus effectively sealed by the interposed sleeve 5.

With the mold halves 1 and 2 closed about the core and sleeve assembly as shown in FIGURE 2, and with the length of plastic material 22 engaging the core 4, the lower end 23 of the length 22 will be radially spaced from the container neck-thread-forming wall portion 17a. The upper end 12 of the sleeve 5, at this point, is preferably disposed slightly beneath the upper end of the radially press molding wall 18.

As shown in FIGURE 2, the upper end 25 of the tubular length 22 is pinched closed by cooperating end portions 1b and 2b of the mold halves 1 and 2 respectively.

Figure 3:
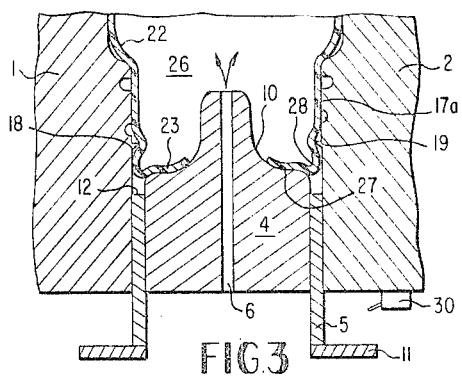
FIGURE 3 is a sectional, schematic illustration of the lower portion of the closed mold assembly shown in FIGURE 2 after radial expansion of the length of plastic material has been effected by introducing pressurized fluid into the interior of the length through the mandrel core.

After the mold halves have been closed and the mold components, mandrel components, and tubular length have assumed the relationships shown in FIGURE 2, pressurized fluid may be introduced into the interior 26 of tubular length 22 by flowing pressurized air through the passage 6 of the core 4. This pressurized air, upon entering the interior space 26, will effect radial expansion or inflation of the tubular length 22 so as to distend the length into conforming engagement with wall portions of mold cavity 3 substantially as shown in FIGURES 3 through 6. FIGURE 3 illustrates the length 22 at a point prior to its having been expanded into full, mold-cavity conformance.

As the radial expansion of sleeve 22 occurs, the lower end 23 of this sleeve will remain in contact with the shoulder 10 of core 4 but will be deflected or folded so as to extend generally laterally away from the projection 9 of the core 4. As shown in FIGURE 3, when the end 23 is deflected laterally outwardly by the pressurized fluid introduced into the interior space 26, the extremity 24 of the tubular length 22 remains spaced from the radially adjacent mold wall means 17a while the outer tubular surface 27 of the end 23 lies in substantially flush engagement with a portion of the core shoulder 10. This flush engagement between the outer tubular surface 27 of the lower folded end of the length 22 with the shoulder 10 of the mandrel core 4 provides an effective air seal which facilitates the inflation or radial enlargement of the length 22. It further insures the maintenance of pressure within the length 22 which will press the lower end of the length downwardly against laterally extending lower wall portions of cavity 3 so as to tend to prevent end 23 from being pushed into the cavity 3 by the advancing core 4.

In order to provide greater stability for the end 23 of the tubular length 22 and to provide additional plastic material for the lateral distension of the end 23, the end 23 may be enlarged in width, as shown schematically in phantom line in FIGURE 1. For example, where a parison has a general thickness of about 1/8 of an inch, the lower end may be enlarged to a thickness of about 3/8 of an inch.

With the upper end 12 of sleeve 5 lying slightly beneath the core shoulder 9, the deflected end 23 of tubular length 22 passes from the core shoulder 10 over and spaced from the sleeve end 12 to lie against the mold wall means 17 at cornerfold 28. Cornerfold 28, which may be considered as the junction between the end portion 23 of the tubular length 22 and the remainder or radially enlarged portion of the length 22, is thus disposed for convenient nipping or gripping by the core 4 when it is advanced into the interior 26 of the tubular length 22 in the manner shortly to be described.

As illustrated, the cornerfold or nip portion 28 of the tubular length 22 lies slightly beneath the rim-like projections 18 and 19. This positioning of the cornerfold 28 is achieved by locating the core 4, prior to the introduction of pressurized air into the tubular length 22, so that the radial press molding wall 8 terminates below but in relatively close proximity to the rims 18 and 19.

As will be appreciated, the sleeve 5, in occupying the annular space between core 4 and wall means 17 of the mold halves 1 and 2, serves to prevent any substantial movement of the end portion 23 of the tubular length 22 into this annular space while the length is being inflated. It is generally desirable for the core 4 and sleeve 5 to be substantially inserted into the passage 16 in the manner illustrated. However, under certain circumstances, it may be feasible to position the sleeve 5, or the sleeve 5 and the mandrel core 4, substantially lower than the positioning shown in FIGURES 2 and 3 so long as the sleeve 5 serves to seal the annular space between the core 4 and adjacent wall portions of the closed mold halves.

Not prior to the introduction of pressurized fluid into the space 26, and preferably concurrent with the initiation of the introduction of this fluid or shortly thereafter, the mandrel core 4 and sleeve 5 may be concurrently raised, i.e., moved toward the end 23 of the length 22.

The upward movement of the sleeve 5 continues until it attains the position shown in FIGURE 4 where the upper sleeve end 12 engages the folded end 23 of the tubular length 22 so as to define an article end 29. By knowing the general position of the fold 28, which is dependent upon the elevation of the core 4, and by knowing that the article end is to be defined just slightly above the fold 28 and slightly beneath the annular rims 18 and 19, the extent of elevation of the core 4 necessary to define the article lower end may be predetermined. When the sleeve 5 has moved through this predetermined distance, conventional control means such as the limit switch 30 schematically shown in FIGURE 4 may be employed to interrupt and stop the upward movement of the sleeve 5. For example, when the sleeve 5 has moved sufficiently so that a portion of the base 11 engages the limit switch 30, the application of pressurized fluid to the piston means associated with piston rods 13a and 13b may be interrupted so as to cause the sleeve 5 to stop at the desired location and thus define the lower article end.

With core 4 moving concurrently with the sleeve 5, and with the radial press molding wall 18 extending slightly above the sleeve 5, the folded corner 28 of the length 22 will be nipped between the upper end of the radial press molding wall 8 and the annular rims 18 and 19 in the manner generally shown in FIGURE 4. This nipping will cause the rims 18 and 19 to inwardly indent the outer periphery of the folded lower end of the tubular length 22, so as to cause this end to be gripped between the mold halves and the core 4 such that upward axial movement of the folded end is effectively impeded. Although such peripheral indenting may not always be necessary, the positive parison gripping secured thereby dictates its general desirability.

After the upward movement of the sleeve 5 has been interrupted and the lower end of the article thus defined, and the nipped end of the length 22 has been gripped by the rims 18 and 19, the continued upward movement of the core 4, as shown in FIGURE 5, is effective to fold the laterally extending end 23 of the tubular length 22 inwardly into the space 26. When the core 4 has completed its upward movement into the space 26, as shown in FIGURE 6, the end portion 23 of the length 22 will have been folded laterally outwardly so as to lie against inner tubular surface 31 of a radially enlarged portion of the length 22. This full folding over of the end of the length 22 provides ample plastic material to insure the proper radial press molding of the container neck through the cooperation of the wall means 17a of the mold halves 1 and 2 and the radial press molding surface 8 of the core 4.

As the wall 8 moxes axially and progressively inwardly into the space 2b, radial press molding pressure will be applied against the folded over end of the length in a longitudinally, progressive fashion so as to accurately and precisely form the container neck threads. The doubling over of the end of the length 22 in the annular space between surface 8 and wall means 17 insures there being an effective air seal between the core 4 and the mold halves.

The function of the shoulder 10 is to serve as an abutment by means of which the laterally extending lip or end 23 of the tubular length 22 may be folded inwardly into the interior of the length 22. Thus, instead of functioning as a transition surface to facilitate the mechanically induced enlargement of the parison end, this shoulder 10 serves as a device to fold a laterally extending parison end portion inwardly and generally toward a previously, radially distended parison portion.

As will be appreciated, the advancing of the core 4, concurrent with the radial enlargement of the plastic length 22, facilitates the inward folding of the end 23. By pushing this end 23 into the parison interior, while it is being deflected laterally as a consequence of the parison inflation, an effective folding action and concurrent maintenance of the seal between the end 23 and the core 4 is assured.

After the core 4 and sleeve 5 have completed their article end forming, upward movements, the mold halves may be separated and the formed article removed from the core 4. The apparatus components may then return to their original positions for subsequent molding operations.

The article produced by the illustrated apparatus and technique is unique in that it includes a press-molded neck portion having a diameter substantially larger than the diameter of the parison from which the article was formed. In this particular application of the invention, maximum advantages are achieved. Sufficient material is provided for the formation of fine detail in the container neck while the formation of peripheral flash is entirely eliminated. After the article is removed from the mold, no further machining of the neck end is required. The inner and outer periphery of the press-molded neck, and the article end which was defined by the mandrel sleeve, are formed with such precision and accuracy as to approach the quality heretofore obtainable only with machining and trimming operations.

Through practicing this invention, it is possible to form an article having a press-molded neck portion which is substantially larger than the parison from which the article was formed without relying upon mechanical distension or enlargement of the parison.

Further advantages of the invention, relating to the production of wide and thick walled article necks, involve the elimination of excessive flash where the upper end of the parison is pinched closed and the avoidance of having to extrude heavy-walled parisons. Were such articles sought to be formed with large diametered parisons, consistent with previously known techniques, an inordinate amount of flash would obviously be formed where the parison was pinched closed. Were the thick neck wall produced by earlier developed extrusion techniques, it would be necessary to deal with thick walled parisons, the forming and manipulation of which are relatively difficult.

While the invention affords particular advantages in the molding of articles such as containers having relatively large and thick walled necks, the significance of the invention is not restricted to this particular application. The manner in which a parison may be inflated with one end being engaged by a mandrel, but free to expand laterally, affords a uniquely simple but effective arrangement for inflating hollow articles.

The described technique for folding over the end of a parison, prior to the press molding of this end, insures there being ample material to accurately form precision article portions such as container neck threads. This fold-over technique entirely avoids the necessity for upsetting a parison end to provide sufficient material for the formation of an article portion such as a container neck.

The arrangement of components is such that the proper positioning of the parison on the mandrel, the closing of the mold halves and the positioning of the mandrel components may be conveniently accomplished with there being ample clearance between the parison and the apparatus components.

The manner in which a parison end is radially inflated into engagement with closed mold portions, prior to the press molding of this parison portion, is particularly significant in that it virtually eliminates the formation of flash on the finished article.

Additional advantages attributable to the invention reside in the uniquely simplified mode of supporting a parison for inflation and press molding within closed mold sections.

Although the invention has been described with reference to preferred method and apparatus embodiment, it will be apparent to those skilled in the art that the invention is not limited to the embodiments specifically illustrated in the application drawings. Those skilled in the art of forming articles from hollow plastic material, with the benefit of this invention, may readily envision additions, deletions, substitutions, and modifications which would be consistent with or equivalent to the form of the invention herein described.

In ascertaining what is deemed to be the scope of the invention, reference may be made to the appended claims.

What is claimed is:

1. A method of forming an article from plastic material, said method comprising:

positioning a generally tubular length of plastic material within a closed, sectional mold, with one end of said length being open and engaging an end of mandrel means, said end of said length being unrestrained against radially outward movement and spaced from interior wall portions of said closed mold sections; and thereafter introducing pressurized fluid into the interior of said length of plastic material so as to cause radial expansion thereof while said end of said length remains in engagement with said end of said mandrel means and the extremity of said end of said length remains spaced from said interior wall portions of said closed mold sections and moving said mandrel means toward said end of said length of plastic material so as to cause said end of said length to fold over inwardly toward the interior of said length and lie adjacent an inner, tubular wall portion of said length.

2. A method of forming an article as described in claim 1 wherein the wall thickness of said end of said length of plastic material which engages said mandrel means, exceeds the wall thickness of an intermediate portion of said length which extends away from said end of said length.

3. A method of forming an article as described in claim 1 wherein the outer tubular periphery of said end of said length of plastic material engages said mandrel means when said length of plastic material is radially expanded by the introduction of pressurized fluid.

4. An apparatus for forming an article from plastic material, said apparatus comprising:

means for positioning a generally tubular length of a plastic material within a closed, sectional mold, with one end of said length being open and engaging an end of mandrel means, said mandrel means having a gradually outwardly expanding shoulder, said end of said length being unrestrained against radially outward movement along the shoulder;

said closed mold sections including interior wall portions radially spaced from said end of said length; and means for introducing pressurized fluid into the interior of said length of plastic material so as to cause radial expansion thereof while said end of said length remains in engagement with said end of said mandrel means and the extremity of said end of said length remains spaced from said interior wall portions of said mold sections.

5. A method as described in claim 1 wherein said end of said length of plastic material is engaged by said mandrel means so that lateral axial displacement of said end relative to said mandrel means is substantially prevented.

6. A method of forming an article as described in claim 1 wherein said end of said length of plastic material is gripped by indenting the outer periphery of the folded end of said length.

7. An apparatus for forming an article from plastic material, said apparatus comprising:
means for positioning a generally tubular length of a plastic material within a closed, sectional mold, with one end of said length being open and engaging an end portion of mandrel means, said mandrel means having a gradually outwardly expanding shoulder, said end of said length being unrestrained against radially outward movement;
said closed mold sections including interior wall portions radially spaced from said end of said length; and
means for moving said mandrel means toward said end of said length of plastic material so as to cause said end of said length to fold over inwardly along said shoulder toward the interior of said length and lie adjacent an inner, tubular wall portion of said length.

8. An apparatus for forming an article from plastic material as described in claim 7, said apparatus including a central projection carried by said mandrel means above said shoulder which is adapted to enter said end of said length of plastic material so as to substantially prevent lateral axial displacement of said end relative to said mandrel means.

9. An apparatus as described in claim 7 for forming an article from plastic material, said apparatus including gripping means projecting radially inwardly from interior wall portions of said mold sections and adapted to indent the outer periphery of said folded end of said length of plastic material.

10. A method of forming an article from plastic material, said method comprising:
positioning a generally tubular, open ended length of a plastic material over a mandrel assembly including a core and an independently movable sleeve, with an open end of said length engaging an end of said core; said open end of said length being unrestrained against radially outward movement;
said end of said length of plastic material being engaged by said core so that lateral axial displacement of said end of said length, relative to said mandrel, is substantially prevented;
closing mold sections about said length of plastic material and relatively positioning said closed mold sections and said mandrel assembly so that at least a portion of an annular space between said core and said closed mold sections is substantially sealed by said sleeve, with said end of said length being radially spaced from laterally adjacent, interior wall portions of said closed mold sections;
introducing pressurized fluid into the interior of said length of plastic material so as to radially enlarge a portion of said length, with said end of said length extending generally laterally outwardly from said core but remaining in contact therewith; and
advancing said core and said sleeve of said mandrel assembly toward said length of plastic material so that said core folds said laterally extending end of said length into the interior of said length into engagement with an inner tubular wall portion of a radially enlarged portion thereof, and said sleeve engages the extremity of said folded end of said length so as to define an article end.

11. A method of forming an article as described in claim 10 wherein said core and said sleeve advance toward said length of plastic material while pressurized fluid is being introduced into the interior of said length, and wherein the advancing movement of said sleeve is interrupted when said article end has been defined but the advancing movement of said core continues so as to effect radial press molding of said folded end of said length of plastic material between said core and radially adjacent, interior wall portions of said closed mold sections.

12. A method of forming an article as described in claim 11 wherein said end of said length of plastic material is gripped by indenting the outer periphery of the folded end of said length.

13. An apparatus for forming an article from plastic material, said apparatus comprising:
means for positioning a generally tubular, open ended length of plastic material over a mandrel assembly including a core having a gradually outwardly expanding shoulder and an independently movable sleeve, with an open end of said length engaging an end of said core and with said open end of said length being unrestrained against radially outward movement;
said mandrel being adapted to engage said end of said length so that lateral, axial displacement of said end of said length, relative to said mandrel, is substantially prevented;
means for relatively positioning said closed mold sections and said mandrel assembly so that at least a portion of an annular space between said core and said closed mold sections is substantially sealed by said sleeve, with said end of said length of plastic material being radially spaced from laterally adjacent wall portions of said closed mold sections;
means for introducing pressurized fluid into the interior of said length so as to radially enlarge a portion of said length, with said end of said length extending generally laterally outwardly along the shoulder of said core but remaining in contact therewith; and
means for advancing said core and said sleeve of said mandrel assembly toward said length of plastic material so that said core folds said laterally extending end of said length into the interior of said length into engagement with an inner tubular wall portion of a radially enlarged portion thereof, and said sleeve engages the extremity of said folded end of said length so as to define an article end.

14. An apparatus for forming an article from tubular plastic material, said apparatus comprising:
sectional mold means;
a mandrel assembly including a core and a sleeve, with said sleeve coaxially encircling said core and being telescopingly movable relative to said core;
said core and said sleeve being disposed with their axes vertically aligned;
said core of said mandel assembly having
a radial, press molding portion telescopingly engaged with said sleeve,
a central, upwardly facing projection extending above said radial press molding portion, and a shoulder gradually tapering laterally between and connecting said radial press molding portion and said central projection,
the radial distance between said central projection and the outer periphery of said sleeve being sufficient to allow the end of a tubular length of plastic material engaged with the upper end of said core to fold over inwardly toward the interior of said length;
means for flowing pressurized fluid into the interior of said length of plastic material whereby at least a portion of said length expands radially and said end of said length in engagement with said core extends generally laterally away from said central projection in contact with said shoulder;
means for advancing said core and said sleeve toward said end of said length of plastic material so that said core folds said laterally extending end of said length into engagement with an inner tubular wall portion of a radially enlarged portion of said length, with the advancing movement of said sleeve being interrupted when the lower extremity of an article to be formed from said length is defined by the engagement of the upper end of said sleeve with said folded end of said length and with the advancing movement of said core continuing after the interruption of the advancing movement of said sleeve so that the radial press molding portion of said core, while axially progressing into said length, radially press molds the folded over end of said length between itself and adjacent inner wall portions of closed mold sections.

15. An apparatus as described in claim 14 for forming an article from plastic material, said apparatus including gripping means projecting radially inwardly from interior wall portions of said mold sections and adapted to indent the outer periphery of said folded end of said length of plastic material.

16. An apparatus for forming an article from tubular plastic material as described in claim 14 wherein the upper end of said sleeve is positioned below the upper end of said radial press molding portion of said core while said length of plastic material is radially expanded and when said advancing movement of said sleeve to fold over said end of said length is initiated.

References Cited by the Examiner
UNITED STATES PATENTS

| | | | |
|---|---|---|---|
| 2,810,934 | 10/1957 | Bailey | 264—98 |
| 3,009,196 | 11/1961 | Hagen | 264—99 |

ROBERT F. WHITE, *Primary Examiner.*

J. A. FINLAYSON, *Assistant Examiner.*